Oct. 18, 1932. O. U. ZERK 1,883,276
TRIPOD
Filed Aug. 17, 1929 4 Sheets-Sheet 3
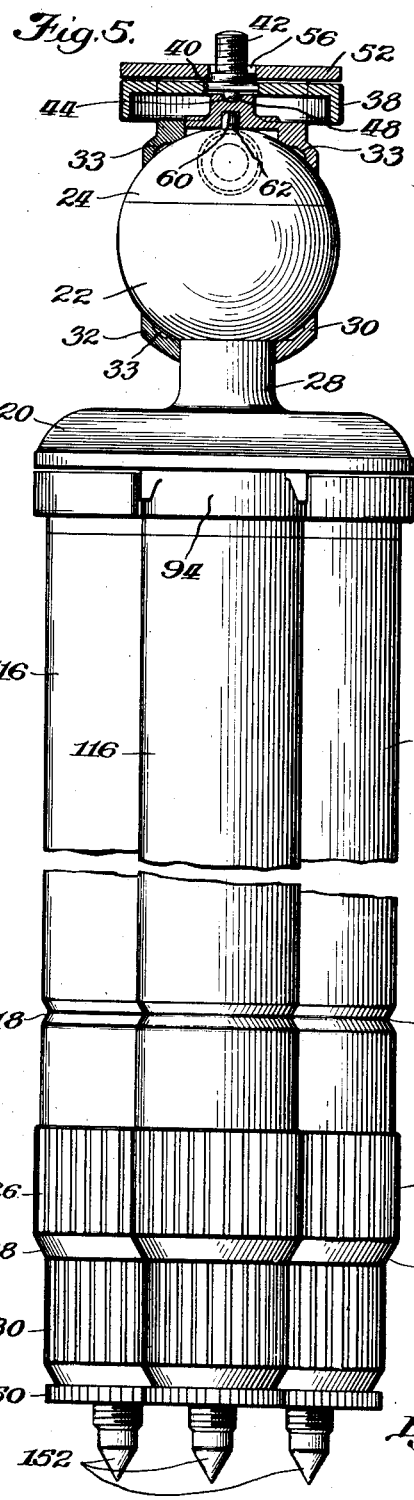
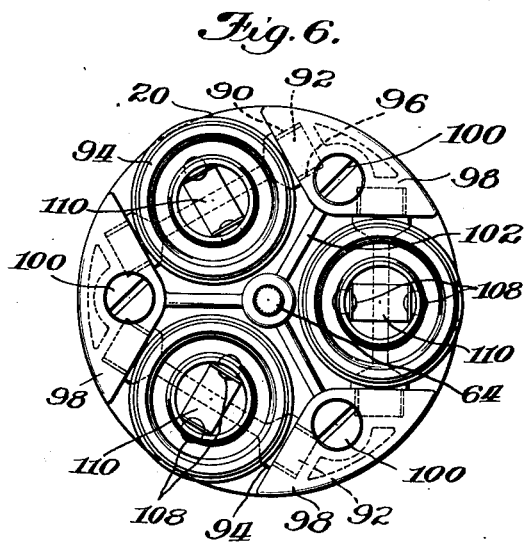
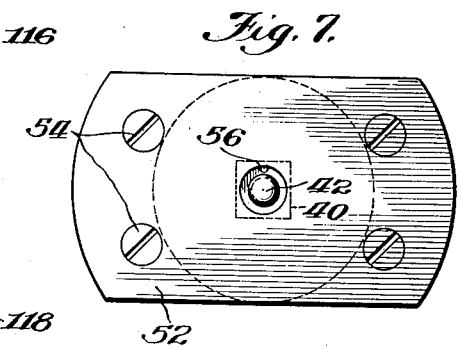
Inventor
Oscar U. Zerk
By Williams Bradbury
McCaleb, Hinkle Attys Oct. 18, 1932.  O. U. ZERK  1,883,276
TRIPOD
Filed Aug. 17, 1929   4 Sheets-Sheet 4
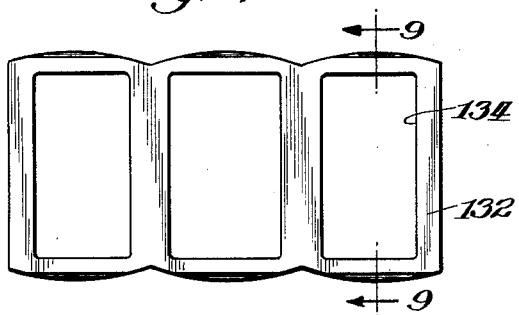
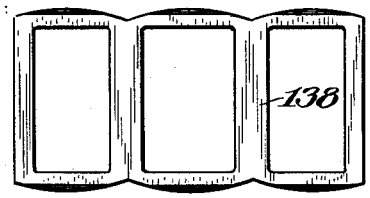
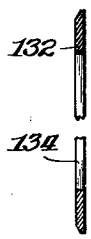
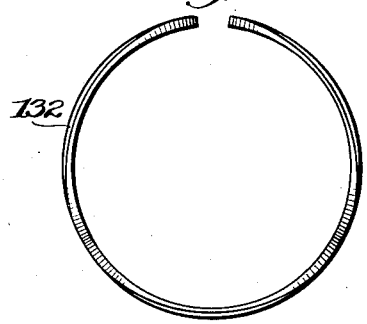
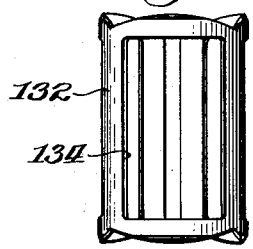
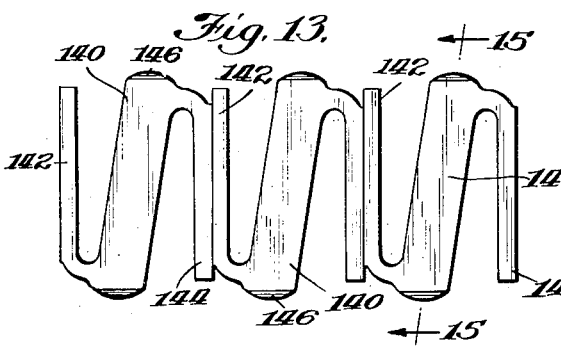
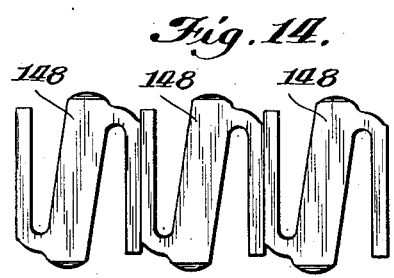
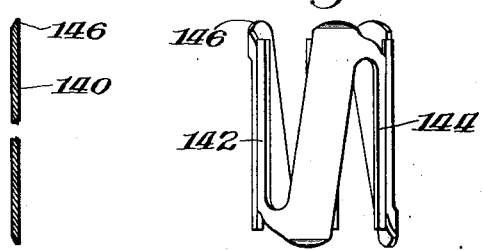
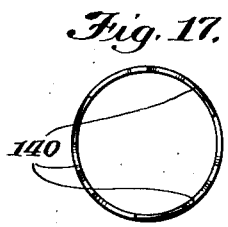
Inventor
Oscar U. Zerk
By Williams Bradbury
McCaleb & Hinkle
Attys.

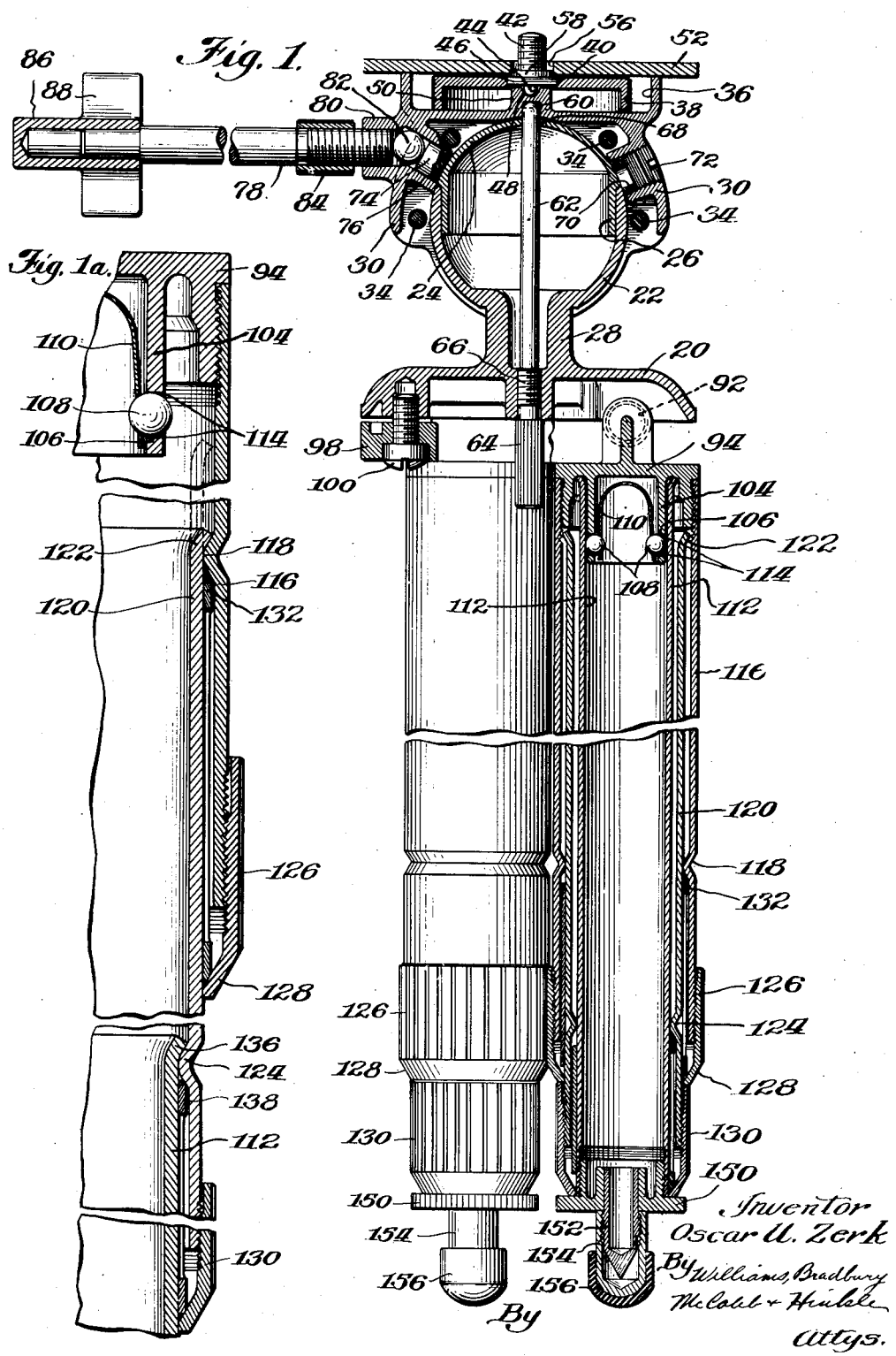

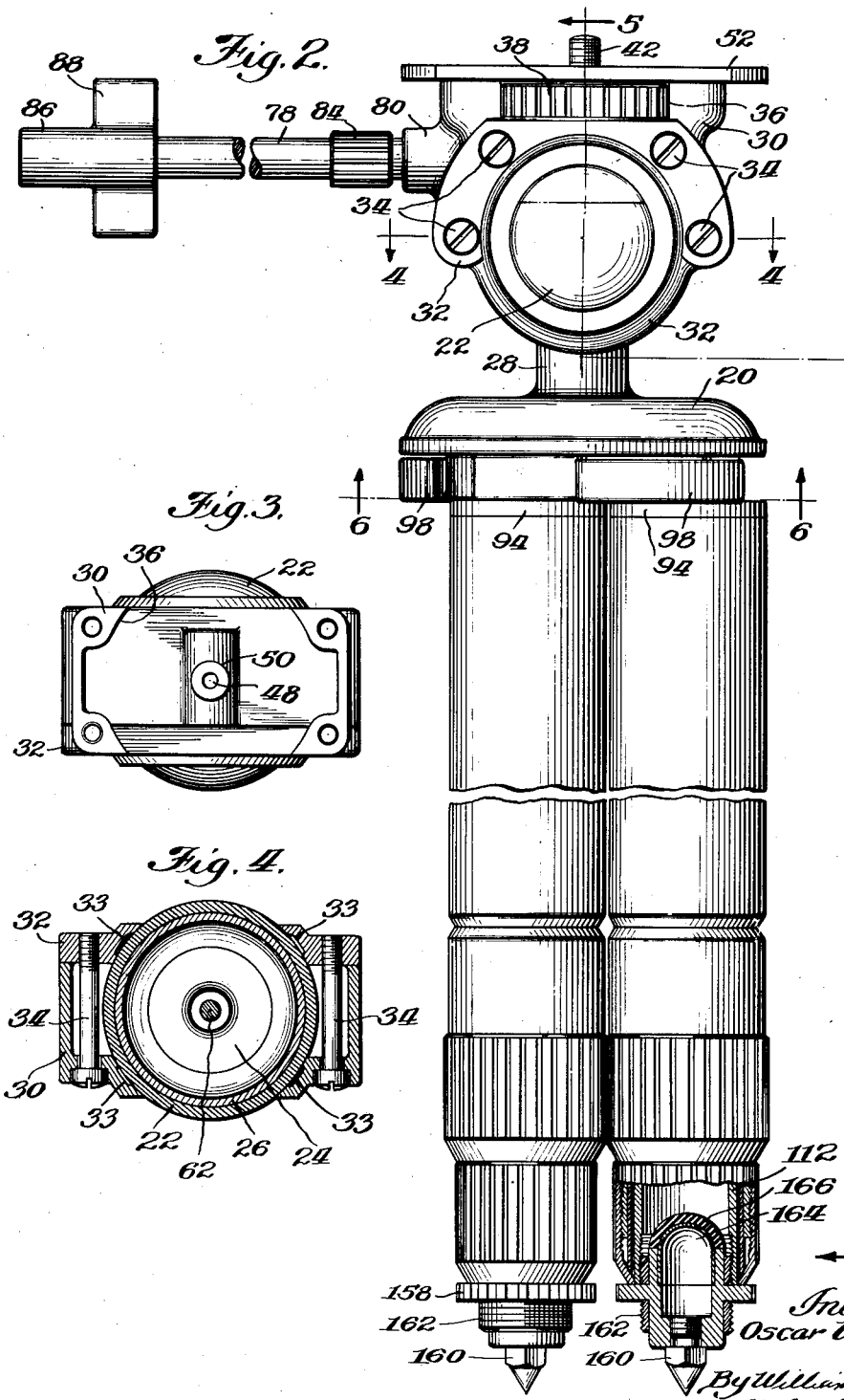

Patented Oct. 18, 1932

1,883,276

UNITED STATES PATENT OFFICE

OSCAR U. ZERK, OF CHICAGO, ILLINOIS

TRIPOD

Application filed August 17, 1929. Serial No. 386,593.

My invention relates, generally to tripods and more particularly to improvements in leg and head structures therefor.

In tripods as at present made, it is a time taking, laborious task to set up the tripod. For example, in the well known wooden split leg type of tripod having three leg sections, it is necessary first to loosen the six screws by which the leg sections are clamped together, then individually extend the legs to the desired length, and thereafter tighten up the six screws to clamp the sections in extended position. Due to the fact that it is necessary to get high clamping pressure by means of each of the screws, these screws are necessarily of low pitch thread and it is usually necessary to turn the screw through at least 540 degrees to rigidly clamp or to unclamp the leg sections. Since by a single manual operation it is convenient to turn the screws approximately only 180 degrees, the unclamping operation at each screw requires at least three separate manual operations. Thus it will require 18 distinct manual operations to unclamp the sections (six joints) to permit them to be extended. It will require an additional six operations to extend the nine sections of the three legs and an additional 18 operations to clamp the leg sections in extended position. The total number of distinct manual operations therefore required to set up the tripod approximates 42. Thereafter the legs must, of course be properly positioned. Similarly, to collapse such a tripod an additional 42 operations or separate movements similar to those above described will be required, thus making a total of 84 distinct manual operations which will be required to set up and collapse the tripod in order to take a single picture.

In the use of the tripod of my invention the number of operations required to set up and collapse the tripod is greatly reduced. It is necessary merely to extend the three legs which may be done by a single manual operation, since the legs are frictionally held in closed position and no unclamping operation is required. With the legs in extended position it is necessary merely to secure the joints between the sections by a single manual operation at each joint. Thus, with a total of seven manual operations (assuming each leg to comprise three leg sections) the tripod will be ready to be set in position. It will therefore be apparent that I have provided a tripod in which the time and labor required to set it up is greatly reduced and I have accomplished this result in a tripod in which the joints are very rigid and staple. In collapsing the tripod legs after use the same saving in time and labor is obtained.

It is thus the primary object of my invention to provide an improved tripod in which the legs may be rapidly extended and collapsed with a minimum amount of effort.

It is a further object of my invention to provide an improved joint between the leg sections which will form a rigid connection between the sections and which may be easily made and broken.

A further object is to provide an improved means for frictionally holding the tripod legs in collapsed position.

A further object is to provide an improved foot piece for tripod legs.

A further object is to provide an improved universal connection for tripod heads in which improved, optionally operable means are incorporated to limit the tripod head to movement in a single plane.

A further object is to provide improved means for frictionally locking the socket portion of a ball and socket tripod head against movement relative to the ball.

A further object is to provide an improved telescoping tripod leg clamping joint in which a clamping pressure may be simultaneously obtained at a plurality of different points spaced circumferentially and longitudinally of the section, and in which this pressure may be applied by a single manual operation.

A further object is to provide an improved tripod leg formed of telescoping sections and in which it is unnecessary to split the sections, whereby greater rigidity is obtained.

Other objects will appear from the following description, reference being had to the accompanying drawings, in which Figure 1 is a central vertical section of my improved tripod, the legs being shown in collapsed position;

Figure 1—a is an enlarged broken sectional view of a portion of one of the legs showing the sections clamped in extended position;

Figure 2 is a side elevation of the tripod shown in Figure 1 with the exception of the substitution of an improved form of foot piece which is shown in central vertical section;

Figure 3 is a plan view of the tripod head with the camera attaching plate removed;

Figure 4 is a horizontal sectional view of the tripod head taken on the line 4—4 of Figure 2;

Figure 5 is a sectional view of the tripod head, the legs being shown in elevation, taken on the line 5—5 of Figure 2;

Figure 6 is a bottom plan view of the tripod head taken on the line 6—6 of Figure 2 with the tripod legs removed;

Figure 7 is a plan view of the camera supporting plate and related parts;

Figure 8 is a developed elevation of the clamping element;

Figure 9 is a transverse sectional view thereof taken on the line 9—9 of Figure 8;

Figure 10 is a plan view of the clamping element after it has been formed;

Figure 11 is an elevation of said clamping element;

Figure 12 is a developed elevational view of the clamping element used in the lower joints;

Figures 13 and 14 are developed elevational views of modified forms of clamping elements used in the upper and lower joints, respectively;

Figure 15 is an enlarged sectional view taken on the line 15—15 of Figure 13;

Figure 16 is an elevation and Figure 17 is a plan view of the modified form of clamping elements shown in Figure 13, the elements being shown in the relative positions assumed by them when used in the joint.

The tripod of my invention is particularly adapted for use with motion picture cameras and especially for use by amateurs using small sized cameras. Although the camera as a whole is thus primarily adapted for amateur motion picture use, a number of the features of my invention may readily be embodied in tripods, for general use, such as supports for range finders, telescopes, surveying instruments, panoramic cameras and the professional type of motion picture cameras.

*The tripod head*

The camera head comprises an inverted saucer-shaped plate 20 which has the lower half 22 of a ball cast integrally therewith. The upper half 24 of the ball has a cylindrical extension 26 forced into the lower half 22 so as to form a complete hollow ball, the ball being connected to the plate 20 by a neck portion 28. A socket surrounding the ball comprises a casting 30 and a plate 32 which are secured together by fillister head cap screws 34. The casting 30 and plate 32 preferably have annular grooves 33 (Figure 5) formed in their ball engaging surfaces, so as to assure a good fit between the ball and socket.

The casting 30, best shown in Figure 3, has a substantially circular recess 36 provided in its upper surface to receive a knurled nut 38 which has a square hole 40 formed at its center. A camera attaching screw 42 has a rounded tip 44, and has a square head 46, fitting into the hole 40, formed at its lower end. The tip 44 rests in a hemispherical recess 48 formed in a boss 50 projecting upwardly from within the recess 36 formed on the casting 30. The nut 38 rests upon the boss 50 and is confined against upward movement by a camera supporting plate 52 which is secured to the casting 30 by screws 54. The plate 52 has a suitable central hole 56 serving as a guide for the cylindrical portion 58 of the screw 42.

The boss 50 has a depression 60 formed in its lower surface, the depression being adapted to receive the end of a guide spindle 62. The spindle 62 has a striated thumb piece 64, a portion 66 screwthreaded into the neck 28, and extends through a hole 68 formed in the upper half 24 of the ball. By means of the thumb piece 64 the spindle may be screwed outwardly (downwardly) so as to remove its extremity from the recess 60, in which event the socket portion is free to move universally with respect to the ball. When, however, the spindle 62 is screwed upwardly so that its extremity lies within the recess 60 the socket portion is limited to rotational movement about the axis of the spindle, as when it is desired to take panoramic views in a horizontal plane, i. e., to "pan" the camera. Suitable friction means are provided to prevent the socket from moving too freely relative to the ball. This means comprises a washer or plug 70 made of a suitable frictional material which is pressed against the ball by a threaded plug 72 screwed into the casting 30. If desired, a spring may be placed between the washer 70 and the plug 72 so as to maintain the washer in frictional engagement with the surface of the ball.

Means are provided frictionally to lock the socket to the ball. This means comprises a relatively hard cylindrical plug 74 which is reciprocable in a bore 76 formed in the casting 30 and which is pressed against the ball by turning a handle 78, the end of which is threaded in a boss 80 formed on the casting 30, a ball 82 serving as a means to transmit the pressure from the end of the handle 78 to the plug. A striated sleeve-like lock nut 84, threaded over the extremity of the handle 78, is adapted to be screwed up against the boss 80 so as rigidly to lock the handle to the socket member by taking up the play or slack between the threads of the handle and the threads in the boss 80. This is especially advantageous when the handle is screwed outwardly, as when "panning" or "tilting", when only a few of the threads of the handle will be within the boss 80. The handle 78 has a finger piece 86 secured at its outer end, preferably by a press fit, the piece 86 having wing portions 88 for convenience in manually rotating the handle 78.

The tripod leg construction

The plate 20 has suitable bearings 90 formed therein to receive trunions 92 formed integrally with caps 94 threaded upon the ends of the tripod legs. A suitable bushing 96 is preferably provided between the trunnions and their bearings so as to minimize wear. Bearing caps 98 are provided to hold the trunnions in place, the caps being secured to the plate 20 by means of fillister head cap screws 100. The plate 20 has suitable reinforcing ribs 102.

Each of the caps 94 has a hollow cylindrical downwardly projecting skirt portion 104 formed integrally therewith, which is suitably drilled at 106 to form a passageway for balls 108 which are resiliently pressed outwardly by an inverted U-shaped spring 110. The spring 110 has adjacent its ends suitable holes of slightly smaller diameter than the balls 108 to hold them and the springs in place, and presses the balls 108 outwardly against the inner leg section 112, thereby resiliently holding the latter in place when the leg is collapsed, as shown in Figure 1. At the outer ends of the holes 106 are suitable small inwardly directed flanges 114 which prevent the balls 108 from being forced outwardly through the holes.

The outer leg section 116 is screwthreaded to the cap 94 and adjacent its lower end has a rolled groove to form an annular, substantially V-shaped annular internal ridge 118. The intermediate leg section 120 has an outwardly flared portion 122 at its upper extremity and adjacent its lower end is bent inwardly to form an annular, substantially V-shaped ridge 124. A locking collar 126 is threaded over the lower end of the outer section 116 and has its lower end 128 tapered inwardly, preferably at an angle less than 45 degrees. A similar locking collar 130 is threaded over the lower end of the intermediate leg section 120.

A resilient clamping element 132 is interposed between the leg sections 116 and 120 and is confined against longitudinal movement between the ridge 118 and the inwardly tapered end portion 128 of the locking nut 126. This clamping element is best shown in Figures 8 to 11 and comprises a thin metallic sheet, substantially rectangular in shape, having a plurality of apertures 134 formed therein. The upper and lower edges of the element 132 are scalloped and champfered. After the element has been formed as thus far described, it is forced around a suitable mandrel to take a cylindrical shape as shown in Figures 10 and 11, in which it will be noted that the ends of the element do not quite meet. The element 132 is of sufficiently resilient material, however, that it may be readily contracted to a smaller diameter and upon release of the clamping force will immediately re-assume its original shape.

When the leg is extended the intermediate section 120 moves outwardly until its movement is limited by the engagement of its flared portion 122 with the ridge 118 on the leg section 116. These two leg sections may then be rigidly clamped together by turning the clamping nut 126 through a relatively small angle, whereupon the lower end 128 of the nut 126 will engage the clamping ring 132 and force the latter upwardly against the tapered side of the annular ridge 118. At the same time the champfered lower edge of the clamping ring will engage the inwardly tapered portion 128 of the nut 126 and thus both the upper and lower edges of the clamping ring will be contracted and forced firmly against the intermediate section 120, the clamping ring 132 being more or less wedged in between the two sections, as best shown in Figure 1—a.

It will be noted that the clamping element has three "high" points at each end thereof. These points will wedge against the ridge 118 and be forced inwardly against the wall of the intermediate section, the maximum pressure being exerted at the three "high" points spaced approximately 120 degrees apart. In a similar manner the inwardly tapered portion 128 of the locking nut will engage the lower edge of the locking element 132 at three points and press the latter into firm frictional engagement with the intermediate section 120 at three points. The leg sections will thus be firmly clamped at six points, forming an extremely rigid joint.

The joint between the intermediate section 120 and the innermost section 112 is formed in a similar manner, the outwardly flared end portion 136 engaging the ridge 124 in the intermediate section 120 and the joint being tightened by turning up the locking nut 130, thereby compressing the locking element 138 and clamping the two sections rigidly together in the manner previously described.

Instead of making the clamping element of a single piece of metal it may conveniently be formed of several separate stampings, as illustrated in Figure 13. Each of these stampings comprises a body portion 140, having arms 142 and 144 extending therefrom. These arms are sufficiently narrow and the material of which the element is made sufficiently resilient that they may bend slightly upon application of pressure. The ends of the body portions 140 of these elements are rounded at 146 and champfered so as to be adapted to engage the surface of the ridge 124 and the surface of the lower inwardly tapered portion 128 of the locking nut 126. Three of these stampings together serve the same purpose as the clamping ring 132 and may be substituted therefor in a tripod leg. These posses several advantages over the clamping element 132 in that they will separately adjust themselves to slight variations in the dimensions of the parts with which they co-operate and will more readily disengage themselves upon release of the clamping pressure exerted by the clamping nut 126. The stampings will be in the position shown in Figures 16 and 17 when positioned about the intermediate tube, their resilient arms permitting them to be forced inwardly sufficiently to engage and rigidly hold the tube sections against relative movement.

As the clamping nut 126 is turned to clamp the two adjacent sections together, the inner surface of its inwardly tapering portion 128 will frictionally engage the chamfered lower ends 146 of the body portions 140 of these elements, while the upper ends 146 will simultaneously frictionally engage the surface of the ridge 116. Such frictional contact or engagement will take place at the beginning of the clamping movement. Thereafter a turning couple, as indicated by the arrows C and D (Figure 16) will be set up on the body portion 140 of each of the elements. The portions 140 of each of the elements will thus tend to move to a vertical position as the clamping nut is further tightened. Since the vertical distance between the end points 146 of each of the body members increases as the body portion moves towards the vertical position, additional clamping pressure is automatically secured. This action is in the nature of a toggle action which greatly multiplies the effect of the manual force applied to the clamping nut and increases the tightness of the clamp. The use of these toggle-like clamping elements also decreases the angle through which it is necessary to rotate the clamping nut to tightly clamp the sections together.

The elements 148 shown in Figure 14 are similar to the clamping arms shown in Figures 13, 15, 16 and 17, the only difference being in size so that they may be used in forming the clamping joint between the intermediate and inner leg sections.

*The leg foot construction*

In Figures 1, I have shown a flanged end piece 150 threaded into the lower extremity of the innermost section 112. A point 152 of hardened material is secured in this end piece, preferably by a press fit, and has external threads for engagement by a metallic cap 154 which is adapted to be threaded over the point whenever it is desired to use the tripod upon the floor or similar smooth surface. The cap 154 has a thin rubber cup 156 vulcanized or bonded thereto, to form a non-scratching, non-slipping surface for contact with the floor.

The foot piece shown in Figure 2 differs from that shown in Figure 1 and comprises an end piece 158 into which a hardened point 160 is threaded. Hardened externally threaded rings 162 are pressed over the end piece 158 and are adapted to thread into the lower end of the inner section 112. A metallic cup-shaped element 164 is pressed into a suitable bore formed in the end piece 158 and is covered with a hollow hemispherical cap 166 which is preferably vulcanized or bonded to the element 164 and to the end piece 158. It will be seen that the end piece 158 may thus conveniently be unscrewed from the inner section 112, reversed and again screwed into the section so as to condition the tripod for use upon smooth floors.

*Operation*

Assuming the tripod to be in collapsed position, as shown in Figure 1, the legs may readily be extended by exerting a manual pull, grasping the end pieces 150, and freeing the inner section 112 from frictional engagement with the balls 108. There is sufficient clearance between the sections so that they will thereafter slide freely relative to one another, due to the force of gravity. The legs may thus be conveniently and quickly extended by grasping the collapsed tripod at the outer leg sections, holding the legs in substantially vertical position and moving them downwardly quickly and suddenly arresting the downward movement. The momentum of the two lower sections will then overcome the friction between the upper ends of the inner sections and the cap of the leg (at the balls 108) with the result that all three legs will be simultaneously extended in a fraction of a second.

After the leg sections have thus been extended it is necessary merely to rotate each one of the locking nuts 126 and 130 approximately a half turn which will be sufficient rigidly to force the clamping elements 132 into locking position between their adjacent sections, in the manner previously described. The tripod will then be ready for use.

It is not necessary that the leg sections be fully extended to permit them to be clamped in position. As indicated by the dotted line position in Figure 1—a, the inner leg sections may be moved to any intermediate position desired and may be clamped in place. This is very desirable especially when the tripod is being used on uneven ground.

The camera, or other instrument may be conveniently attached by resting it upon the plate 52 and rotating the nut 38 which will turn the screw 42 into the usual threaded socket formed in the bottom of the instrument. It will be noted that the weight of the camera is not transmitted to the nut 38 but is borne directly on the thrust bearing formed by the tip 44 fitting in the hemispherical recess 48.

Assuming the spindle 62 to be in lower position where its upper end does not project into the recess 60, the operator may move the camera in any desired direction, the washer 70 exerting a sufficient frictional drag to hold the camera in adjusted position. If it is desired to photograph a single view without moving the camera, as when taking a still picture, the socket 30 may be locked to the ball 22 by loosening the clamping nut 84 and then screwing in the handle 78, thereby transmitting the clamping pressure through the ball 82 to the plug 74, the inner end, which conforms to the shape of the ball, presses against the latter and thus clamps it in the socket.

If it is desired to take a panoramic view in a horizontal plane, the spindle 62 is screwed upwardly until its end projects into the recess 60, whereupon movement of the socket relative to the ball will be limited to rotational movement about the axis of the spindle.

When the operator has finished using the tripod, the handle 78 may readily be disconnected, and the legs collapsed after loosening the clamping nuts 126 and 130. The leg sections will telescope one with the other, the inner sections engaging and being held in "closed" position by the balls 108.

It will thus be seen that I have provided a tripod leg construction which is extremely simple and which will make the leg very rigid. The extension of a leg can be effected by three simple manual operations, (1), loosening the inner section from the holding balls 108 and permitting the leg sections to fall by the force of gravity, (2), giving approximately a half turn to the nut 126 to clamp the intermediate and outer leg sections together, and (3), giving the nut 130 a similar turn to clamp the inner leg section to the intermediate section. If desired, all three leg sections may be loosened simultaneously so that the total operations necessary to set up the tripod will be reduced to seven. When the tripod is set up the leg joints are so firmly made that the tripod will, for its size, support unusually heavy weights and will be able to withstand repeated vibration without loosening the joints.

The ball and socket head is also of simplified construction and permits maximum of tilting movement of the socket relative to the ball without sacrificing the essential characteristic of rigidity. It will be understood that wherever possible the parts are made of aluminum alloy and that as a result the tripod is extremely light in weight for a given weight carrying capacity. If desired, four or even more leg sections may be used instead of three, thereby slightly decreasing the possible over-all length of the tripod when in collapsed position. However, with three leg sections as shown the tripod in collapsed position is very compact and may be easily carried.

While the embodiments of my invention herein shown and described are admirably adapted to fill the objects primarily stated, it is to be understood that it is not intended to confine the invention to the embodiments herein described, for it is susceptible of embodiment in various forms, all coming within the scope of the claims which follow.

I claim:

1. In a tripod, the combination of a plurality of telescoping tubular leg sections, annular V-shaped ridges formed on said sections for limiting outward movement thereof relative to one another, a plurality of resilient clamping elements having wedge-shaped ends, one of said elements being interposed between each pair of adjacent sections, a clamping nut threaded on the outer of each pair of adjacent sections, and a tapering surface on each of said nuts for contracting and forcing its associated clamping element into tight frictional contact with its adjacent sections at a plurality of points near said ridges and near the tapering surface of said nut, said element being normally at a slight angle relative to the axes of said leg section and movable more nearly into parallelism with said axes thereby to increase the clamping action.

2. In a collapsible supporting leg, the combination of a pair of tubular telescoping leg sections, and means for clamping said sections together in partially or completely extended position, said means comprising an element normally freely movable between the lower end of the outer of said sections and the inner of said sections and normally assuming a position at an angle to the axes of said sections, and means cooperating with said outer section to move said element to clamping position by swinging it toward a position more nearly in alignment with the axes of said sections, whereby said leg sections will be held against longitudinal movement.

3. In a collapsible supporting leg, the combination of a pair of tubular telescoping leg sections, and means for clamping said sections together, said means comprising a plurality of elements, each having a central body portion and a pair of resilient arms, said elements being positioned between the lower end of the outer of said sections and said inner section with the body portions thereof normally at a slight angle relative to the axes of said sections, and means for moving said elements into clamping engagement with said sections and swinging the body portions thereof to a position in which they will be more nearly in alignment with the axes of said sections thereby to prevent relative movement between said sections.

4. In a tripod leg, the combination of inner and outer telescoping tubular leg sections, means to limit outward movement of said inner section, a plurality of elongated resilient clamping elements positioned between said sections and normally having their longitudinal axes at a slight angle relative to the axes of said sections, and means on said outer section to twist said elements into tight frictional clamping engagement with said sections in a direction tending to swing their longitudinal axes more nearly into parallelism with the axes of said sections.

5. In a tripod leg, the combination of inner and outer telescoping tubular leg sections, means to limit outward movement of said inner section, means for clamping together adjacent leg sections comprising a fixed abutment and a movable abutment carried by the outer section, and a resilient ring composed of a plurality of connected V-shaped sections and having thickened ends interposed between said abutments and adapted to have wedging engagement therewith to provide clamping areas between the sections spaced apart substantially the length of the resilient ring.

6. In a tripod leg, the combination of inner and outer telescoping tubular leg sections, means to limit outward movement of said inner section, a resilient clamping element positioned between said sections, said element having an elongated portion extending at a small angle to the axis of the tripod leg, and means on said outer section to force said clamping element in tight frictional engagement with said inner section and to swing said elongated portion of said element more nearly into alignment with the axis of the tripod leg.

7. In a collapsible supporting leg, the combination of a pair of tubular, freely telescoping leg sections, and means for rigidly clamping said sections together in partially or completely extended position, said means comprising a clamping member positioned within the outer of said sections adjacent the lower end thereof and having an element normally at a slight angle relative to the axes of said sections, and means cooperating with said outer section to contact with and force said clamping means into firm engagement with the inner of said sections and to a position more nearly in alignment with the axes of said sections.

In witness whereof, I hereunto subscribe my name this 8th day of August, 1929.

OSCAR U. ZERK.